United States Patent [19]

Warren

[11] Patent Number: 4,549,716

[45] Date of Patent: Oct. 29, 1985

[54] CONTROL HANDLE ARRANGEMENT FOR A FLUID CONTROL VALVE

[76] Inventor: Timothy P. Warren, 3 Erica St., Canterbury, Victoria 3126, Australia

[21] Appl. No.: 561,659

[22] Filed: Dec. 15, 1983

[51] Int. Cl.[4] .............................................. F16K 35/02
[52] U.S. Cl. ......................................... 251/96; 74/25; 74/111; 74/548; 74/554; 192/67 R; 192/95; 251/229; 251/230
[58] Field of Search .................... 251/95, 96, 230, 229, 251/288; 74/552, 553, 554, 548, 25, 111; 192/67 R, 95; 403/1

[56] References Cited

U.S. PATENT DOCUMENTS

| | | | |
|---|---|---|---|
| 2,194,714 | 3/1940 | Mueller | 251/96 |
| 2,236,109 | 3/1941 | Mueller | 251/96 |
| 2,501,008 | 3/1950 | Schramm | 192/95 |
| 2,780,333 | 2/1957 | Reiser et al. | 192/95 |
| 2,829,538 | 4/1958 | Mueller | 251/96 |
| 3,193,243 | 7/1965 | Billington et al. | 251/96 |
| 3,210,040 | 10/1965 | Thurlow | 251/96 |
| 3,986,409 | 10/1976 | Tripp et al. | 192/95 |

Primary Examiner—George L. Walton
Attorney, Agent, or Firm—Dennison, Meserole, Pollack & Scheiner

[57] ABSTRACT

A handle arrangement for a hot water tap or faucet which requires an axial and rotational movement of the handle in order to turn the tap "on" or a rotational movement only, in order to turn the tap "off". When applied to a hot water tap the handle arrangement provides a safety device against rotation by young children as the combination of movements is difficult or impossible for young children to overcome. The arrangement comprises a spindle member 11 which is attached to an existing tap spindle 18 by grub screws 19 and co-operates with a drive member 13 fixed to the handle to provide a ratchet arrangement between a drive member 13 and spindle member 11. The ratchet arrangement allows the tap to be turned off merely by rotation of the handle but does not engage when the tap is rotated in the direction to turn the tap on. A hexagonal protrusion 14 inside the handle co-operates with the handle member 11 to cause rotation of the handle when the handle is depressed axially inwardly.

7 Claims, 5 Drawing Figures

U.S. Patent    Oct. 29, 1985    4,549,716
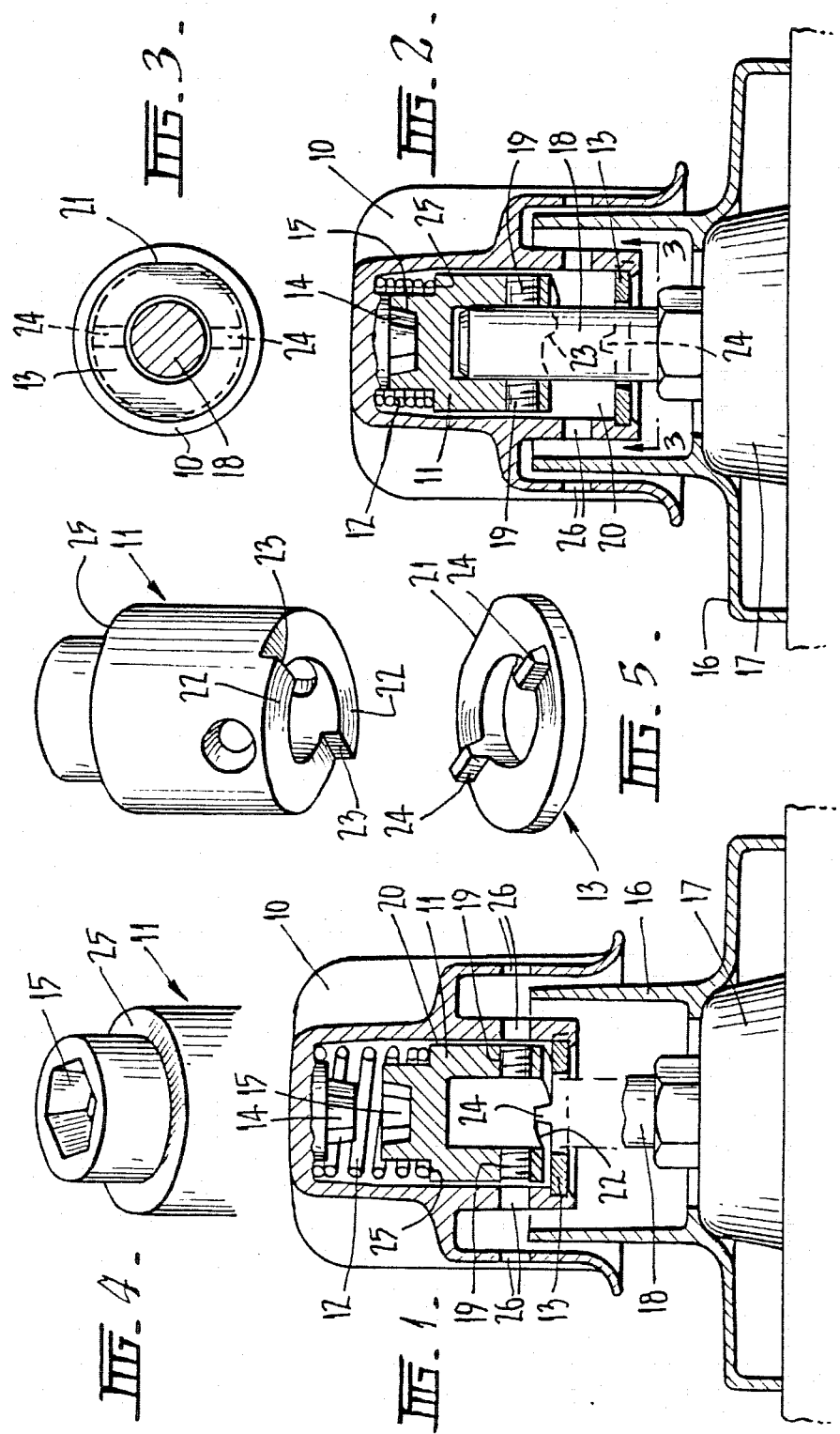

CONTROL HANDLE ARRANGEMENT FOR A FLUID CONTROL VALVE

This invention relates to a control handle arrangement for a fluid control valve and particularly, but not exclusively, to a handle arrangement for a domestic water tap or faucet. More specifically the invention relates to a control handle which requires two separate and distinct movements in order to open the valve and which, therefore, may be termed a child safety handle because it is most difficult or impossible for young children to operate. When applied to a hot water tap the handle arangement prevents or substantially reduces the number of serious scaldings which occur when young children unknowingly operate such taps.

Child safety taps or child-proof taps of the general kind referred to herein are known and one example is disclosed in earlier Australian patent application No. 7,172/66 which has long since lapsed. The tap disclosed in 7,172/66 has a clutch arrangement formed in the tap spindle and axial movement of the handle is required in order to engage the clutch arrangement to turn the tap "on" or "off". Whilst the principle of operation is satisfactory in providing a child-proof tap two disadvantages are now apparent with this particular known device. Firstly, since the tap spindle is required to have a clutch arrangement a special or non-standard spindle is required and therefore when installing the known device in existing locations it is necessary to replace the tap spindle which usually requires replacing the tap body including the spindle. It is therefore relatively costly to provide the known device in existing locations since the device itself is relatively costly and in many instances it is necessary to employ a skilled plumber to carry out the necessary installation work. Furthermore, with the above known arrangement it is necessary to move the handle axially both in turning the tap "on" and "off" and it is considered undesirable to have to provide axial movement in turning the tap "off" as in emergency situations where the tap must be turned "off" quickly such axial movement may cause undue difficulty or delay.

Thus it is an object of the present invention to provide an improved control handle arrangement for fluid control valves which overcomes one or both of the aforementioned disadvantages of the known arrangements.

Accordingly the invention provides a control handle arrangement for a fluid control valve of the kind having an operating spindle adapted for rotation in opposite directions to open and close said valve and a handle for rotating said spindle, characterized in that, said handle must be moved away from a normal position in a direction axially of said spindle, in order that rotation of said handle in a first direction causes said spindle to rotate in a direction to turn said valve "on" and that rotation of said handle in a second and opposite direction, whilst said handle is in said normal position, causes said spindle to rotate in a direction to turn said valve "off".

In order that the invention may be more readily understood one particular embodiment, in the form of a handle for a domestic hot water tap, will now be described in detail with reference to the accompanying drawings wherein:

FIG. 1 is a side elevation partly in section of a tap handle arrangement according to the invention, mounted on a hot water tap and shown in a normal position, position, FIG. 2 is a similar view to FIG. 1 but showing the handle in an axially displaced position, FIG. 3 is a section on the line 3—3 of FIG. 2, FIG. 4 is a part perspective view of a spindle member according to the embodiment and FIG. 5 is a perspective view of the spindle member shown in FIG. 4 together with a first drive member which co-operates with the inner end of the spindle member to provide a ratchet arrangement.

Referring now to FIGS. 1 and 2 it can be seen that the handle arangement according to this embodiment consists essentially of four components, namely a handle 10, a spindle member 11, a compression spring 12 and a first drive member 13. The handle 10 includes a hexagonal protrusion 14 on the inside thereof which constitutes a second drive member for co-operating with a complementary recess 15 formed in the top or outer end of the spindle member 11. A flange member 16 which is not essential to the invention is adapted to fit over the top of the tap body 17 and extends into a recess in the underside of the handle 10 for the purpose of concealing the spindle 18 and thus enhancing the aesthetics of the arrangement.

According to this embodiment the various components are cast in non-corrosive metal but clearly other suitable materials may be used. The spindle member 11 is adapted to fit over the top or outer end of the spindle 18 in engagement therewith and grub screws 19 are adapted to be tightened onto the spindle 18 to rigidly secure the spindle member 11 in position. The grub screws 19 have hexagonal heads (not shown) for accepting a conventional Allen key. The handle 10 has an inner cylindrical cavity 20 extending axially, that is, along the axis of rotation of the handle and the spindle member 11 is arranged to fit slidingly within the cavity 20. The cavity 20 is terminated at its inner end by the first drive member 13 which fits into a stepped annular recess in the bottom or inner end of the wall defining cavity 20. Once the components are assembled with the compression spring 12 and spindle member 11 within the cavity 20 the first drive member 13 is permanently fixed in position in the inner end of the cavity 20 by crimping the walls of the cavity partly over the drive member 13 whereby it is rigidly held in position. The drive member 13 has a flattened portion 21 on the circumference thereof so as to ensure that the drive member 13 rotates with rotation of the handle 10. The flattened portion 21 is shown more clearly in FIG. 3 and co-operates with a corresponding flattened portion in the side of the annular stepped portion of the handle 10.

The bottom or inner end of the spindle member 11 has opposite helical surfaces 22 and stepped faces 23 which co-operate with radially extending opposed steps 24 on the first drive member 13, to form a ratchet arrangement for purposes which will become apparent hereinbelow.

As stated above, the spring 12 and spindle member 11 are inserted within the cylindrical cavity 20 of the handle 10 and are retained therein by the first drive member 13 which closes the bottom or inner end of the cavity 20 except for a central hole which allows the spindle 18 to project therein. The spindle member 11 has a shoulder 25 which forms a locating means for the inner end of the spring 12 and the upper or outer end of the spring 12 is accommodated in an annular groove formed in the handle 10. In order to mount the handle arrangement on an existing tap spindle, it is merely necessary to pass the outer end of the spindle through the hole in drive member 13 and into the central bore of spindle member 11. Once the spindle member 11 is in position over the spindle 18, the opposed grub screws 19 may be tightened onto the spindle and for this purpose aligned holes 26 are provided in the inner and outer walls of the handle 10 to allow the passage of a suitable Allan key for tightening the grub screws 19. With the grub screws suitably tightened the handle is ready for use. Of course it will have been necessary to install the flange 16 over the top portion of the tap body 17 in installations which require such a flange.

In use the handle arrangement operates as follows. In the normal position shown in FIG. 1, the spring 12 forces the handle 10 away from the spindle member 11 in an upward or outward direction, that is, away from the tap body 17. In this position, the opposed steps 24 of the first drive member 13 engage the inner end surface of the spindle member 11 either on or adjacent the helical surfaces 22. Rotation of the handle 10 in an anticlockwise direction when viewed from above, that is, in a direction which would conventionally turn the tap on, causes the first drive member 13 to rotate with the handle and because of the arrangement of the ratchet between the drive member 13 and spindle member 11, there is no corresponding rotation of the spindle member 11; the ratchet is merely moving in a non-engaging direction. In other words, the opposed steps 24 of the first drive member 13 ride up the helical surfaces 22 of the spindle member 11 and over the stepped faces 23. There is a slight "clicking" noise as this rotation of the handle is continued due to the operation of the ratchet but there is no rotation of the spindle and the tap is unable to be turned on.

In order to turn the tap on it is necessary to depress the handle, that is, move the handle axially inwardly towards the tap body 17 such that the hexagonal protrusion 14 constituting the second drive member engages the corresponding recess 15 in the outer end of the spindle member 11. With the handle in this depressed condition the second drive member causes the spindle member 11 to rotate with rotation of the handle 10 to turn the tap on and of course with the handle in this depressed condition the tap may also be turned off. Immediately any external inward force is released from the handle 10 it is caused to return to the normal position as shown in FIG. 1 by means of the compression spring 12. As is evident in FIG. 2 with the handle in the depressed position the engaging surfaces of the ratchet are separated.

Assuming the tap is already in the "on" condition, rotation of the handle in a clockwise direction when viewed from above, that is, in a direction to turn the tap "off" will cause rotation of the spindle member 11 and hence the spindle 18. Such rotation of the spindle 18 will occur whether the handle is in the normal position as shown in FIG. 1 or the depressed position as shown in FIG. 2. In the normal position the opposed steps 24 of the first drive member 13 will engage the stepped faces 23 of the spindle member 11 and cause rotation of the spindle member 11. In the depressed condition of FIG. 2 the second drive member comprising hexagonal protrusion 14 will engage in the recess 15 at the outer end of the spindle member 11 and likewise cause rotation of the spindle member 11. Thus the tap may be turned to an "off" position without depressing the handle 10 as is necessary in order to turn the tap to an "on" condition.

It should be evident from the above that the handle arrangement according to this invention provides an improved means for operating fluid control valves in a manner which facilitates several improvements over prior art devices. Particularly when appllied to domestic hot water taps the arrangement of the present invention provides considerable safety against accidental opening of the tap valve by young children. It is neccessary for a young child to perform a two-stage operation in order to turn the tap on and this is most difficult or impossible to achieve. Clearly the handle arrangement may have other uses than as a safety device for young children. For example, the handle arrangement may be incorporated into shower recesses to ensure that the user does not accidentally open the hot tap valve whilst standing under the spray. Since the handle arrangement may be readily ftted to existing tap spindles, the need to replace the tap spindle is obviated. It is conceivable that in a modification to the above described embodiment the handle arrangement may comprise the necessary components of the assembly, formed in such a manner as to accept an existing tap handle whereby various standard tap handles may be utilized rather than the special handle 10 as described above. Clearly various modifications to the invention may be readily provided without departing from the spirit and scope of the invention as is apparent from the following claims.

I claim:

1. A control handle arrangement for a water tap with a fluid control valve of the kind having an operating spindle adapted for rotation in first and second opposite directions to respectively close and open said valve, said handle arrangement including a handle, spindle engaging means mounted on said spindle for mounting said handle on said spindle for axial movement of the handle thereon relative to said spindle between a normal position and a moved position, first drive means engageable, in the normal position of said handle, between said handle and said spindle engaging means for rotational driving of said spindle solely in said first direction, in response to rotation of said handle, to close said valve, said handle, in the normal position, allowing movement of said handle in the opposite direction independently of said spindle without affecting the position of said valve, and second drive means, in the moved position of said handle, between said handle and said spindle engaging means for rotational driving of said spindle in said second direction, upon rotation of said handle, to open said valve while simultaneously disengaging said first drive means between said handle and said spindle.

2. A control handle arrangement as defined in claim 1 wherein said means for mounting said handle on said spindle comprises a spindle member, means for fixedly securing said spindle member to said spindle whereby rotation of said spindle member will effect a corresponding rotation of said spindle, said handle being retained on said spindle member for movement thereon axially of said spindle, said first drive means including a first drive member on said handle and a cooperating first drive component on said spindle member engaging said first drive member solely in the normal position of said handle, said second drive means including a second drive member on said handle and a cooperating second drive component on said spindle member engaging said second drive member solely in the moved position of said handle.

3. A control handle arrangement as defined in claim 2 wherein said spindle member is received over and about said spindle, said spindle member including inner and outer ends, said first and second drive components being respectively at the inner and outer ends of said spindle member, said handle including a cylindrical chamber with an open inner end, said spindle member being received in said chamber through said open inner end, said first drive member being at the innner end of said chamber and underlying the inner end of the spindle member for driving cooperation with said first drive component when said handle is in said normal position, said first drive member retaining said spindle member within said chamber.

4. A control handle arrangement as defined in claim 3 wherein said cylindrical chamber includes a closed outer end, said second drive member being at said outer end of said chamber and engageable with the second drive component of said spindle member in the moved position of said handle, said chamber being of a depth sufficient to permit longitudinal shifting of the handle relative to the spindle member to alternatively engage each drive member independently of the other.

5. A control handle arrangement as defined in claim 4 wherein said first drive member and said cooperating drive component define a ratchet drive allowing only uni-directional driving, said second drive member comprising a polygonal protrusion at the closed outer end of said chamber, said second drive component comprising a complementary polygonal recess for receiving said protrusion whereby said second drive means provides for bi-directional rotational driving of said spindle member and spindle.

6. A control handle arrangement as defined in any one of claims 1, 2, 3 or 4 wherein said second drive means provides for rotational driving of said spindle in opposite directions.

7. A control handle arrangement as defined in any one of claims 1, 2, 3 or 4 wherein said first drive means defines a ratchet drive providing a driving engagement between the handle and the spindle in one rotational direction and a free rotational movement of the handle relative to the spindle in the opposite rotational direction.

* * * * *